(12) United States Patent
Yamaguchi et al.

(10) Patent No.: US 12,549,932 B2
(45) Date of Patent: Feb. 10, 2026

(54) COMMUNICATION SYSTEM AND DATA INPUT CONTROL PROGRAM

(71) Applicant: Konica Minolta, Inc., Tokyo (JP)

(72) Inventors: Takehisa Yamaguchi, Tokyo (JP); Takeshi Maekawa, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 409 days.

(21) Appl. No.: 18/271,785

(22) PCT Filed: Oct. 26, 2021

(86) PCT No.: PCT/JP2021/039414
§ 371 (c)(1),
(2) Date: Oct. 10, 2023

(87) PCT Pub. No.: WO2022/158069
PCT Pub. Date: Jul. 28, 2022

(65) Prior Publication Data
US 2025/0294333 A1  Sep. 18, 2025

(30) Foreign Application Priority Data
Jan. 25, 2021 (JP) .................... 2021-009449

(51) Int. Cl.
*H04W 4/70* (2018.01)
*H04W 4/38* (2018.01)

(52) U.S. Cl.
CPC .............. *H04W 4/70* (2018.02); *H04W 4/38* (2018.02)

(58) Field of Classification Search
CPC .................................. H04W 4/70; H04W 4/38
USPC .......................................................... 370/328
See application file for complete search history.

(56) References Cited

U.S. PATENT DOCUMENTS

| | | |
|---|---|---|
| 2016/0261481 A1 | 9/2016 | Ogata et al. |
| 2018/0293513 A1 | 10/2018 | Sugaya |
| 2019/0041235 A1 | 2/2019 | Ko et al. |

FOREIGN PATENT DOCUMENTS

| | | |
|---|---|---|
| JP | 2016-163242 A | 9/2016 |
| JP | 6267838 B1 | 1/2018 |
| JP | 2019-032185 A | 2/2019 |

OTHER PUBLICATIONS

International Search Report dated Jan. 25, 2022, for the corresponding international patent application No. PCT/JP2021/039414.

*Primary Examiner* — Mark G. Pannell
(74) *Attorney, Agent, or Firm* — LUCAS & MERCANTI, LLP

(57) ABSTRACT

A communication system that enables acquisition of data from a terminal device only as needed and when needed. A communication system including a terminal device including a sensing, a network system at least a part of which includes wireless communication, and a server that performs wireless communication with the terminal device through the network system and processes data received from the terminal device, in which the communication system includes a controller that controls the terminal device, and the controller transmits, to the terminal device, control information for switching the data to be input to the server according to processing of the data by the server.

31 Claims, 7 Drawing Sheets

COMMUNICATION SYSTEM AND DATA INPUT CONTROL PROGRAM

CROSS REFERENCE TO RELATED APPLICATION

This Application is a 371 of PCT/JP2021/039414 filed on Oct. 26, 2021, which claimed priority of Japanese Patent Application 2021-009449 filed on Jan. 25, 2021, all of which are incorporated herein by reference.

TECHNICAL FIELD

The present invention relates to a communication system and a data input control program.

BACKGROUND ART

In the fifth generation mobile communication system (5G), in addition to its use through communication carriers, a self-operated private 5G (also referred to as local 5G) is also attracting attentions. In particular, in a private 5G environment, it is possible to enjoy original specifications of 5G at a high level, such as the number of simultaneous connections of terminal devices, and low latency characteristics. Such an infrastructure in 5G is expected to collect various kinds of information from terminals (edge devices) equipped with various sensors to use the information for machine learning.

The conventional technique for collecting information from a plurality of terminal devices includes, for example, Patent Literature 1. According to Patent Literature 1, learning is performed by acquiring data for predetermined machine learning from a combination of sensor devices (corresponding to terminal devices) in a network. In addition, a computer system that outputs the result is disclosed therein. With this computer system, the processing capacity of the terminal devices connected to the gateway is acquired. Then, if the acquired processing capacity is equal to or more than a predetermined capacity, the terminal device is caused to execute machine learning, and if not, the terminal device is caused to perform only data transmission.

CITATION LIST

Patent Literature

Patent Literature 1: JP 6267838 B

SUMMARY OF INVENTION

Technical Problems

In data communication, a capacity capable of simultaneous transmission and receipt is limited. As the amount of data to be transmitted and received increases, a communication load increases, and a delay occurs, accordingly. In addition, data that is not always required is included in collected data from the terminal device. Meanwhile, the data that is not always required may be required occasionally.

Unfortunately, in the conventional technique, either one of machine learning or data transmission is just selectively executed in accordance with the processing capability of each of a plurality of terminal devices. Thus, it is not possible to change required data in real time nor to perform the control of the terminal device that is required for the change.

Therefore, an object of the present invention is to provide a communication system and a data input control program that enable acquisition of data from a terminal device only as needed and when needed.

Solution to Problems

The above-described object of the present invention is achieved by the following means.

(1) A communication system including a terminal device including a sensing device,
a network system at least a part of which includes wireless communication, and
a server that performs wireless communication with the terminal device through the network system and processes data received from the terminal device, in which
the communication system includes a controller that controls the terminal device, and
the controller transmits, to the terminal device, control information for switching the data to be input to the server according to processing of the data by the server.

(2) The communication system according to (1) described above, in which the terminal device includes a plurality of the sensing devices.

(3) The communication system according to (1) or (2) described above, the communication system includes a plurality of the terminal devices.

(4) The communication system according to (3), in which the control information includes control information for stopping the terminal device and causing the terminal device to transmit data to another terminal device that is stopped.

(5) The communication system according to any one of (1) to (4) described above, in which the control information includes a control program and/or logical data for controlling the terminal device.

(6) The communication system according to (5) described above, in which the control program and/or the logical data includes a command to switch between use and non-use of the sensing device.

(7) The communication system according to (6) described above, in which the terminal device witches between use and non-use of the sensing device, and transmits, to the server, the data including information detected by the sensing device that is in use, by executing the control program and/or the logical data.

(8) The communication system according to (5) or (6) described above, in which the control program and/or the logical data includes a command to start or stop transmission of the data from the terminal device to the server.

(9) The communication system according to (8) described above, in which the terminal device starts or stops transmission of the data to the server, by executing the control program and/or the logical data.

(10) The communication system according to any one of (5) to (9) described above, in which the control program and/or the logical data includes at least one command selected from the group consisting of a command to stop power supplied to the sensing device, a command to stop communication with the sensing device, and a command to rewrite a learning model of the terminal device.

(11) The communication system according to (10) described above, in which the terminal device executes at least one selected from the group consisting of stopping power supplied to the sensing device, stopping communication with the sensing device, and rewriting a learning model of the terminal device, by executing the control program and/or the logical data.

(12) The communication system according to any one of (5) to (11) described above, in which the controller generates the control program and/or the logical data by learning the data.

(13) The communication system according to any one of (5) to (12) described above, in which the control program and/or the logical data includes snapshot data of a program for controlling the terminal device.

(14) The communication system according to any one of (1) to (13) described above, in which the control information includes information related to setting of the data.

(15) The communication system according to (14) described above, in which the sensing device includes an image sensor, and
the information related to setting of the data includes at least one piece of information selected from the group consisting of a setting of a zoom magnification of image data detected by the image sensor, a setting of a frame rate thereof, a setting of a resolution thereof, a setting of a data format thereof, a setting of a color gradation thereof, a setting of a compression ratio thereof, and a setting of whether or not to output thereof.

(16) The communication system according to (15) described above, in which the terminal device transmits, to the server, the image data after switching setting of the image data based on information related to setting of the data.

(17) The communication system according to any one of (1) to (16) described above, in which the terminal device requests the controller to transmit the control information.

(18) In the communication system according to any one of (1) to (17) described above, in which the terminal device switches between use and non-use of the sensing device according to an environmental characteristic.

(19) The communication system according to (18) described above, in which the environmental characteristic includes at least one of temperature, humidity, and illuminance around the terminal device.

(20) The communication system according to any one of (1) to (19) described above, in which the terminal device notifies the controller of an operating time period of the sensing device.

(21) The communication system according to any one of (1) to (20) described above, in which the terminal device includes a storage, and
the terminal device stores information detected by the sensing device in the storage when a data amount of information detected by the sensing device exceeds a predetermined data amount.

(22) A program for causing a computer connected to communication system comprising a terminal device including a sensing device,
a network system at least a part of which includes wireless communication, and
a server that performs wireless communication with the terminal device through the network system and processes data received from the terminal device to control input to the server, and
the data input control program for causing the computer to execute a step (a) of transmitting, to the terminal device, control information for switching the data to be input to the server according to processing of the data by the server.

(23) The data input control program according to (22) described above, in which the control information includes a control program and/or logical data for controlling the terminal device.

(24) The data input control program according to (23) described above, in which the control program and/or the logical data includes a command to switch between use and non-use of the sensing device.

(25) The data input control program according to (23) or (24) described above, in which the control program and/or the logical data includes a command to start or stop transmission of the data from the terminal device to the server.

(26) The data input control program according to any one of (23) to (25) described above, in which the control program and/or the logical data includes at least one command selected from the group consisting of a command to stop power supplied to the sensing device, a command to stop communication with the sensing device, and a command to rewrite a learning model of the terminal device.

(27) The data input control program according to any one of (23) to (26) described above, including a step (b) of generating the control program and/or the logical data by learning the data.

(28) The data input control program according to any one of (23) to (27) described above, in which the control program and/or the logical data includes snapshot data of a program for controlling the terminal device.

(29) The data input control program according to any one of (22) to (28) described above, in which the control information includes information related to setting of the data.

(30) The data input control program according to (29) described above, in which the sensing device includes an image sensor, and
the information related to setting of the data includes at least one piece of information selected from the group consisting of a setting of a zoom magnification of image data detected by the image sensor, a setting of a frame rate thereof, a setting of a resolution thereof, a setting of a data format thereof, a setting of a color gradation thereof, a setting of a compression ratio thereof, and a setting of whether or not to output thereof.

(31) The data input control program according to any one of (22) to (30) described above, in which the step (a) is executed in response to a request for transmission of control information transmitted from the terminal device.

Advantageous Effects of Invention

In the present invention, control information for changing data to be input to a server is transmitted to a terminal device in accordance with data processing by the server. Then, the terminal device transmits the data changed in accordance with the control information to the server. Thus, in the present invention, the server can acquire data from the terminal device only as needed and when needed.

DESCRIPTION OF EMBODIMENTS

Figure 1:
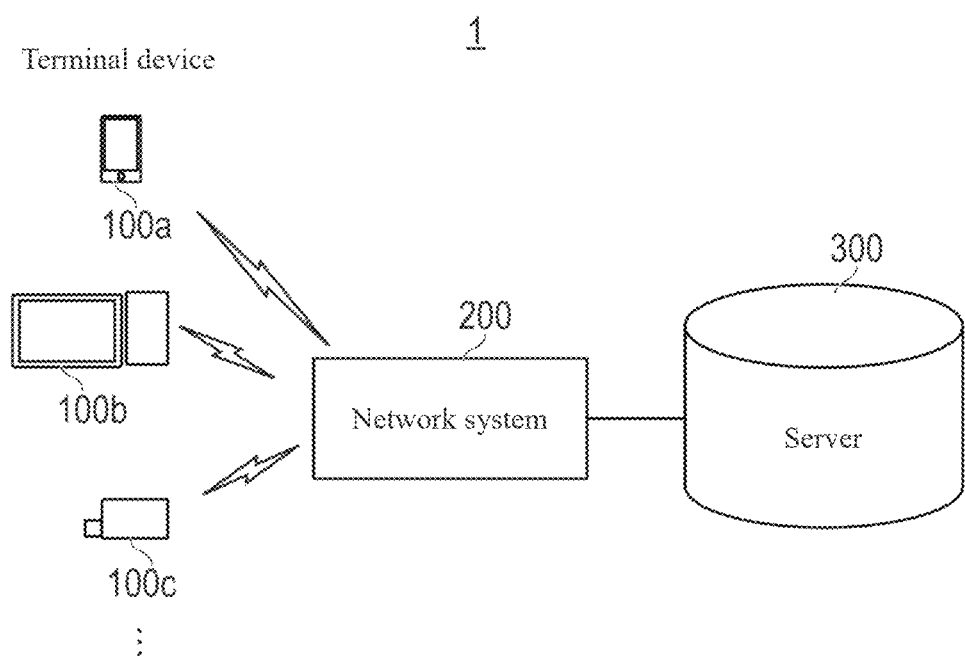
FIG. 1 is a diagram illustrating a schematic configuration of a communication system according to an embodiment of the present invention.

Hereinafter, embodiments of the present invention will be described in detail with reference to the drawings. Note that in the description of the drawings, the same elements are denoted by the same reference signs, and redundant description thereof will be omitted. In addition, dimensional ratios in the drawings are exaggerated for convenience of description and may be different from actual ratios.

First Embodiment

Communication System

Figure 2:
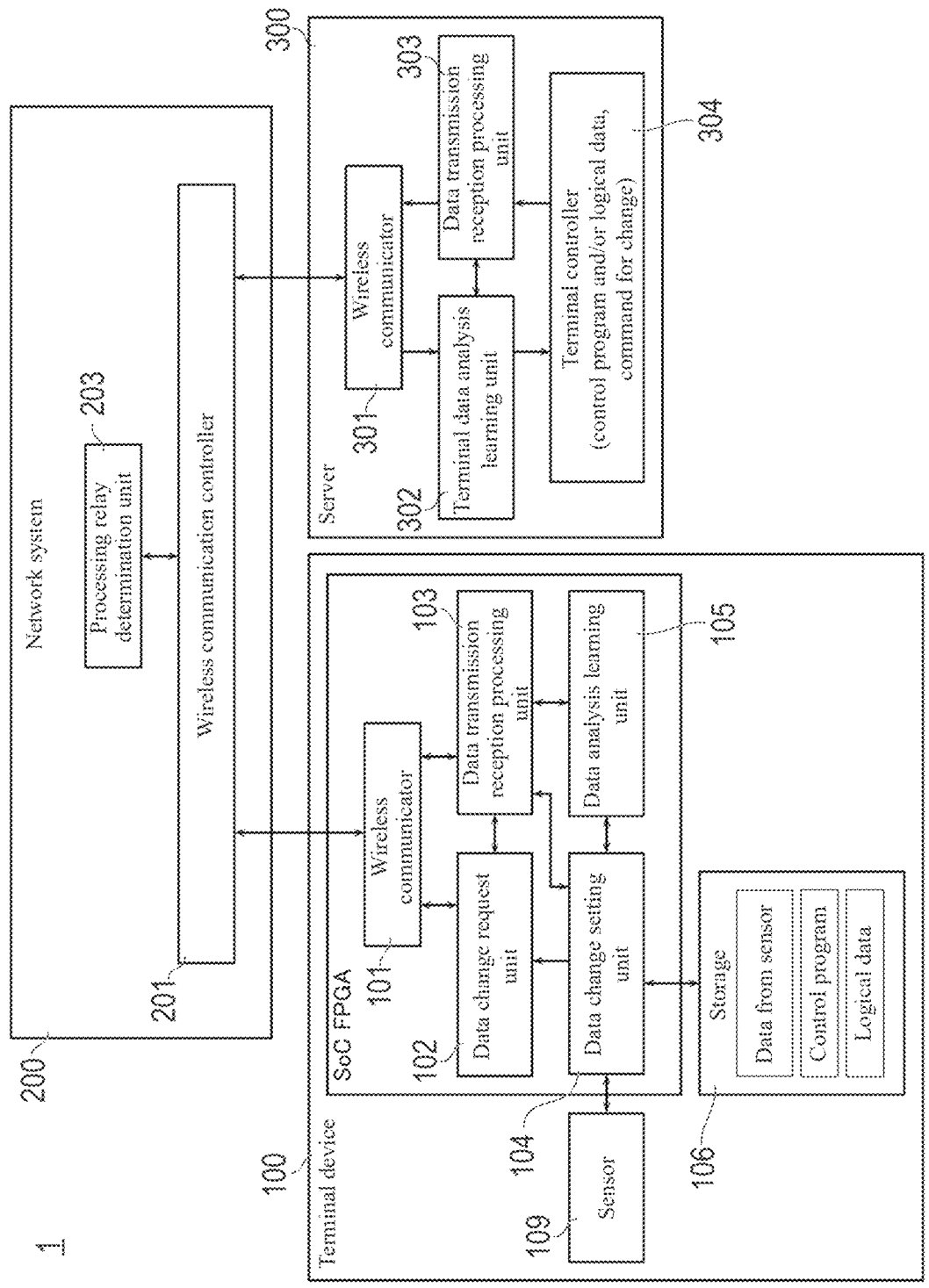
FIG. 2 is a block diagram for illustrating a function of the communication system according to an embodiment.

FIG. 1 is a diagram illustrating a schematic configuration of a communication system 1 according to an embodiment of the present invention. FIG. 2 is a block diagram for illustrating a function of the communication system 1 according to an embodiment.

As illustrated in FIGS. 1 and 2, the communication system 1 according to an embodiment includes the following.
- terminal devices 100 (100a, 100b, 100c, . . . )
- a network system 200
- and a server 300

The communication system 1 is, for example, a private 5G communication system.

Terminal Device 100

First, the terminal devices 100 will be described. The terminal device 100 includes a sensing device (hereinafter simply referred to as a sensor 109), and transmits information detected by the sensor 109 to the server 300. In addition, the terminal device 100 also performs machine learning and determination on its own from information detected by the sensor 109.

Such a terminal device 100 is also referred to as an edge device, an edge terminal, or the like, and is an electronic device that can also be used for IoT. The terminal device 100 is, for example, as follows.
- a portable terminal device 100a such as a smartphone or a tablet computer
- a fixed terminal device 100b such as a personal computer
- a monitoring camera device 100c with a wireless device attached to a camera and the like These terminal devices 100a, 100b, and 100c are all devices in which the sensor 109 and a computer including a wireless communication function are integrated or locally connected. In the description, these terminal devices 100a, 100b, and 100c are referred to as terminal device 100 unless otherwise specified.

As illustrated in FIG. 2, the terminal device 100 includes the following.
- a wireless communicator 101
- a data change request unit 102
- a data transmission reception processing unit 103
- a data change setting unit 104
- a data analysis learning unit 105

In the terminal device 100, a storage 106 and the sensor 109 are connected (or integrated).

The wireless communicator 101 communicates with the network system 200 in 5G. The wireless communicator 101 transmits data from the terminal device 100 to the network system 200. The network system 200 transmits data, according to the destination of the data transmitted from the terminal device 100, to the server 300. In addition, the wireless communicator 101 receives data transmitted from the server 300 via the network system 200.

The data change request unit 102 requests the server 300 to change data to be transmitted from the terminal device 100 to the server 300. That is, the data change request unit 102 makes the following request to the server 300.

The server 300 transmits, to the terminal device 100, control information (command) for changing data to be transmitted from the terminal device 100 to the server 300.

Specifically, for example, the data change request unit 102 requests the server 300 to transmit necessary data based on the learning result by the terminal device 100 itself. For example, in a case where the sensor 109 is an image sensor, the data change request unit 102 makes the following requests when there is no change in the image during a predetermined time period.
- a stop of data transmission or stop of a sensor, or
- a change such as decreasing of resolution of image data.

Conversely, for example, when the image frequently changes during a predetermined time period, the data change request unit 102 requests one of the following changes.
- a restart of data transmission or activation of a sensor
- a change such as increasing of resolution of image data.

Note that in a case where data to be transmitted can be changed by the terminal device 100 on its own, the data change request unit 102 notifies the server 300 that the data to be transmitted has been changed. By receiving the notification that the data has been changed, the server 300 can grasp what the changed data is like. Accordingly, the server 300 can determine whether or not the current setting and the setting to be changed to are the same when the data is changed subsequently.

In addition to the above, the operating time of the sensor 109 or the operating time period of the terminal device 100 including the sensor 109 may be notified from the terminal device 100 to the server 300. Long-time operation of devices such as the sensor 109 and the terminal device 100 imposes a heavy load on the devices. By acquiring the notification on the operation time period of the devices, the server 300 can grasp the operation time period of the device. Then, the server 300 can transmit the control information for stopping the device, for example, when the continuous operating time period of the device exceeds the continuous operating time period predetermined in its specification. Accordingly, in the first embodiment, it is possible to prevent a sudden malfunction of the sensor 109 or the terminal device 100 including the sensor 109 beforehand. Of course, the control based on the operating time period may be executed by the terminal device 100 itself.

The data transmission reception processing unit 103 processes data transmitted to and received from the server 300. Data transmitted from the terminal device 100 is, for example, the followings.

data collected by the sensor 109
    data requested from the data change request unit 102
    data of a result of analysis (described below) and/or learning (described below) of the data analysis learning unit 105 or the like.

The data transmission reception processing unit 103 once receives these pieces of data from the respective units to perform necessary processing thereon, and outputs them to the wireless communicator 101. The necessary processing is, for example, labeling, integration or compression of data, other data processing, or the like.

The data transmission reception processing unit 103 receives data including the control information from the server 300. The control information is, for example, a control program (described below) and/or logical data (described below) including a command for controlling the terminal device 100. In addition, the control information is data related to setting of data. The data transmission reception processing unit 103 performs necessary processing on the received data to output them to each unit. The necessary processing is, for example, decompression or expansion of integrated or compressed data, sorting according to labeling, other re-processing or restoration of processed data, or the like. The data transmission reception processing unit 103 transmits, to the data change setting unit 104, data including the control information received from the server 300, and causes the storage 106 to store the data as necessary.

When the control information is a control program and/or logical data, the data change setting unit 104 changes the function of the terminal device 100 in accordance with the control program and/or the logical data. For example, as the function change, the terminal device 100 switches between use and non-use of the sensor 109. In a case where one sensor 109 is connected to the terminal device 100, the control program and/or the logical data is rewritten in the terminal device 100. Accordingly, use and non-use of the single sensor 109 can be switched. In addition, in a case where a plurality of sensors 109 is connected to the terminal device 100, the control program and/or the logical data are rewritten in the terminal device 100. Accordingly, use and non-use of each of the plurality of sensors 109 can be switched. In a case where the sensor 109 is in non-use, the data change setting unit 104 may stop the power supply to the sensor 109 in accordance with the control program and/or the logical data. By stopping the power supply to the sensor 109, energy saving is achieved.

When the control information is the control program and/or the logical data and is the command to rewrite a learning model, the data change setting unit 104 performs the following processing. To rewrite the learning model for analysis and/or learning that is executed by the data analysis learning unit 105 (described below) of the terminal device 100.

When the control information is information related to the setting of data, the data change setting unit 104 changes the setting related to the data detected by the sensor 109. In a case where the sensor 109 is, for example, an image sensor, the setting related to data is at least one selected from the group consisting of the following settings.

a setting of a zoom magnification of image data
    a setting of a frame rate thereof
    a setting of a resolution thereof
    a setting of a data format thereof
    a setting of a color gradation thereof
    a setting of a compression rate thereof
    a setting of whether or not to output data thereof In a case where a zoom lens is used in the image sensor (camera), the zoom magnification includes a change in the magnification of the zoom lens. In a case where a zoom lens is not used in the image sensor (camera), the zoom magnification is simply the magnification of the image data The setting of whether or not to output data is a setting of whether or not to transmit data detected by the sensor 109 to the server 300. When the data detected by the sensor 109 is transmitted to the server 300, the data change setting unit 104 outputs, to the data transmission reception processing unit 103, the data from the sensor 109. There are three methods with which the data detected by the sensor 109 is not transmitted to the server 300. According to a first method, communication with the sensor 109 is stopped not to receive data from the sensor 109. According to a second method, the data is not transmitted (output) to the server 300, but the data from the sensor 109 is stored in the storage 106 during that time period. In the first and the second methods, the power is continuously supplied to the sensor 109, so that it does not take time to restart the sensor 109. According to a third method, the power supply to the sensor 109 is stopped. In the third method, since the power supply to the sensor 109 is stopped, energy saving is achieved.

In addition, the data detected by the sensor 109 may be stored in the storage 106 when the amount of data to be transmitted exceeds a predetermined amount of data. Specifically, for example, in a case where the resolution is increased, the amount of data to be transmitted from the terminal device 100 increases. Then, when the amount of data exceeds the predetermined amount of data, the terminal device 100 once stores the data to be transmitted in the storage 106, and divides the data to transmits the divided data. In addition, for example, the terminal device 100 receives, from the network system 200, information such as a currently communicable amount of data. Then, the terminal device 100 stores, in the storage 106, the data exceeding the communicable amount of data (predetermined amount of data) that is received. In addition to the above, the terminal device 100 may transmit the stored data when the communicable amount of data becomes larger.

The data analysis learning unit 105 analyzes and/or learns the data detected by the sensor 109. For example, in a case where the sensor 109 is an image sensor, the data analysis learning unit 105 performs the following analysis. the data analysis learning unit 105 analyzes the image data in time series through image processing to determine a change in the image and to identify a person or an object. The learning by the data analysis learning unit 105 is, for example, machine learning using image data. An example of the machine learning includes deep learning. Specifically, for example, in the analysis by the data analysis learning unit 105, the following processing is performed based on a previous learning result or the control program and/or the logical data transmitted from the server 300. The data analysis learning unit 105 executes, from the image data detected by the sensor 109, immediate identification of a person or an object, counting of the number of people or objects, and the like. In addition, in a case where the sensor 109 is a thermal camera, in the analysis by data analysis learning unit 105, determination of the temperature of a person or an object, identification of a person or an object with no less than a certain temperature, or the like is performed. In addition, in the learning by the data analysis learning unit 105, for example, the machine learning is performed using data of persons as teaching data and using image data from the sensor 109 as an input Accordingly, the learning result used for identification of a person can be obtained. Note that the data analysis learning unit 105 may execute either the analysis or the learning or may execute both of them according to the performance of the terminal device 100. Alternatively, the data analysis learning unit 105 may not be provided according to the performance of the terminal device 100.

The content of the analysis and/or the learning executed by the data analysis learning unit 105 is changed by the control program and/or the logical data received from the server 300.

The storage 106 stores therein the result analyzed and/or learned by the data analysis learning unit 105. In addition, the storage 106 stores therein the data from the sensor 109. In addition, the storage 106 stores therein the control program and/or the logical data for operating the terminal device 100.

Note that there is no need to store all of the above-described data in the storage 106, and the capacity of the storage 106 is determined in accordance with the cost or the like of the terminal device 100. Then, the content stored in the storage 106 may be appropriately changed in accordance with the capacity. For example, the storage 106 may store therein only data from the sensor 109. In this case, the terminal device 100 downloads the control program and/or the logical data from the server 300 for use.

Alternatively, the storage 106 may not be provided. In this case, the terminal device 100 downloads the control program and/or the logical data from the server 300 for use. Since the storage 106 is not provided, a further cost reduction of the terminal device 100 is achieved.

The sensor 109 is, for example, an image sensor. The image sensor is, for example, a camera that mainly detects visible light. In addition, the sensor 109 is an infrared camera, a thermal camera (temperature detection camera), or the like. In addition, as the sensor 109, for example, the following various sensors can be used.

an acoustic sensor that detects sound like a microphone
an altitude sensor that detects altitude (above sea level)
an atmospheric pressure sensor
an underwater depth sensor (water pressure sensor)
a vibration sensor
an orientation sensor
an angle sensor
a temperature sensor
a voltage sensor
an electric current sensor
and an electric power sensor and the like Data detected by these sensors 109 is transmitted to the server 300 as necessary. In addition, the data detected by the sensors 109 is also stored in the storage 106 as necessary.

One of such sensors 109 may be connected to (or integrated with, the same applies hereinafter) one terminal device 100. Alternatively, a plurality of sensors 109 may be connected to (or integrated with, the same applies hereinafter) one terminal device 100. In a case where a plurality of sensors 109 is connected to one terminal device 100, the plurality of sensors 109 may be of the similar type or of different types. For example, the plurality of sensors 109 may be image sensors (cameras).

Figure 3:
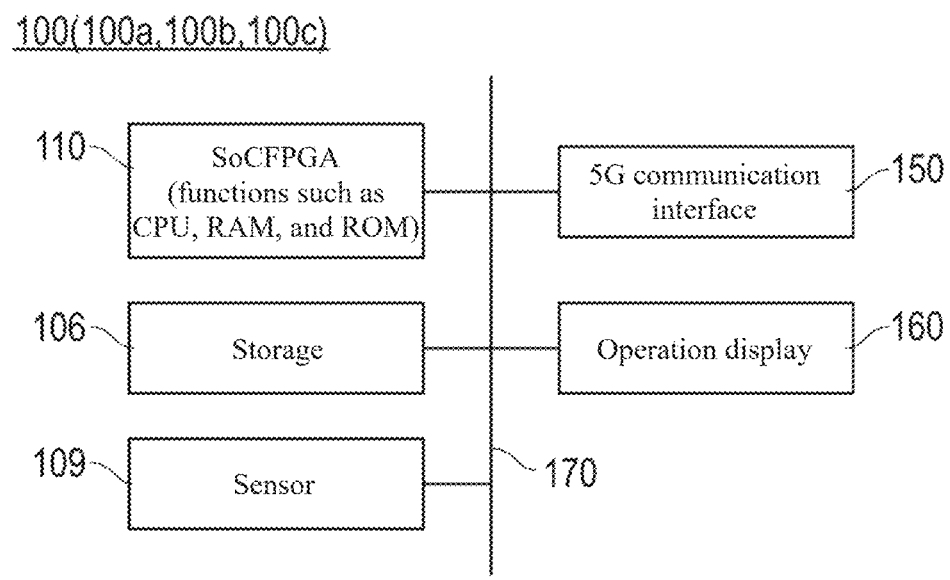
FIG. 3 is a block diagram illustrating an example of a hardware configuration of a terminal device.

Note that the terminal device 100 may be provided with, for example, the following wireless communication interfaces and the like in addition to the communication in 5G.
Ethernet®
a network interface based on a standard such as IEEE1394
Bluetooth®
IEEE802.11 and the like FIG. 3 is a block diagram illustrating an example of a hardware configuration of the terminal device 100.

The terminal device 100 is a computer. As illustrated in FIG. 3, the terminal device 100 includes a SoCFPGA 110, the storage 106, a 5G communication interface 150, and an operation display 160.

The SoCFPGA 110 is a semiconductor device (including a semiconductor device in which a plurality of chips is bonded) in which an FPGA that can rewrite processing content to be executed is formed as a system in one chip. The SoCFPGA 110 may also be referred to as a programmable SoC. In the SoCFPGA 110, the following functions are formed in one chip (or a plurality of chips including these plural functions is integrated).

a central processing unit (CPU) serving as an arithmetic element,
a read only memory (ROM) serving as a storage element,
a random access memory (RAM) and the like In addition, an accelerator such as a GPU/DSP may be mounted on the SoCFPGA 110. Such a SoCFPGA 110 stores a control program and/or logical data necessary for the operation (including rewriting of a gate circuit in the FPGA). Then, those are executed, and thus the functions of the respective units of the terminal device 100 described above are implemented. Thus, the SoCFPGA 110 functions as the data change request unit 102, the data transmission reception processing unit 103, the data change setting unit 104, and the data analysis learning unit 105.

The storage 106 is a storage medium as follows.
an embedded MultiMediaCard (eMMC),
a solid state drive (SSD),
a hard disk drive (HDD) or the like.

Alternatively, the storage 106 may be a portable storage medium such as a memory card.

The 5G communication interface 150 is the wireless communicator 101 for communicating with the network system 200 in 5G, and includes a communication module chip. Note that the 5G communication interface 150 may also be integrated as the SoCFPGA 110.

The operation display 160 is, for example, a touch panel type display, and the operation display 160 displays various types of information and receives various types of input from a user. In addition, depending on the terminal device 100, an input device such as a keyboard or a mouse and a monitor or the like may be connected to each other.

The control program for the hardware of the terminal device 100 is a program executed mainly by the CPU of the terminal device 100 or the circuit of the CPU function in the FPGA. Meanwhile, the logical data is mainly data for rewriting circuit data of the FPGA.

Note that the terminal device 100 is not limited to the SoCFPGA 110, and may be an FPGA other than a SoC. In addition, the terminal device 100 may have a form in which a CPU, a RAM, a ROM, and the like are independent and are connected through a bus.

Network System 200

Next, the network system 200 will be described. The network system 200 includes a wireless 5G communication function and controls communication between the terminal device 100 and the server 300.

As illustrated in FIG. 2, the network system 200 includes a wireless communication controller 201 and a processing relay determination unit 203. The network system 200 communicates with the terminal device 100 and the server 300 in 5G. Thus, the network system 200 is a radio base station and a core network device of 5G.

The wireless communication controller 201 controls communication with other electronic devices. In the present embodiment, the wireless communication controller 201 controls 5G communication between the terminal device 100 and the server 300.

For example, the following references describe about the 5G communication.

Reference 1 "Local 5G Column, 5th vol, Latest legal consideration status and key issues and solutions at the time of considering the introduction that have become apparent now", CTC system management (URL=https://ctcs.secure-link.jp/special/local5g/p0087.htm).

Reference 1 (in particular, see "4. Consideration of TDD synchronization becomes more complicated"), discloses a technique in which a communication time in a communication channel is divided into "time slots" for every extremely short fixed period of time, and with the slot, the uplink (U) and the downlink (D) are distributed.

Reference 2: "Consideration status by the technical study working group, the new-generation mobile communications system committee"

See pages 27 (28th sheet) of a distribution material of the technical study working group, the new-generation mobile communications system committee, the information and communication technology subcommittee, Information and Communications Council, the Ministry of Internal Affairs and Communications on Feb. 27, 2018 (the 6th session). (URL=https://www.soumu.go.jp/main_content/000536171.pdf).

Reference 2 discloses a technique of flexibly setting of a switching cycle of download (DL)/upload (UL) as a semi-static TDD, and a technique of switching DL/UL for each symbol as dynamic TDD.

Note that the transport ratio of the uplink channel to the downlink channel may be adjusted by other methods.

When detecting communication malfunction, the processing relay determination unit 203 stops the communication and reset the setting to the original setting.

Figure 4:
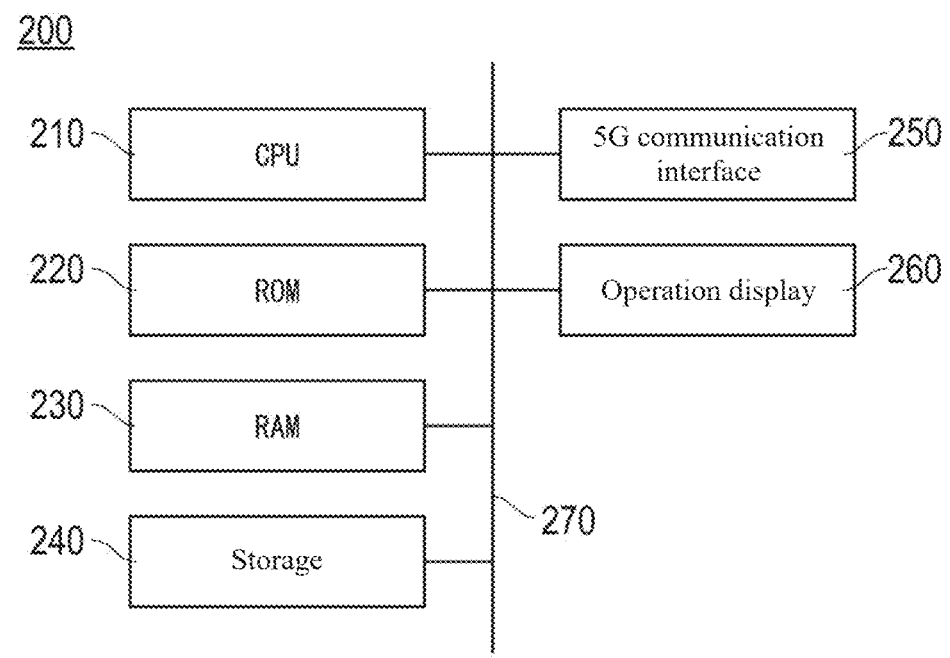
FIG. 4 is a block diagram illustrating an outline of hardware configuring a network system.

FIG. 4 is a block diagram illustrating an outline of hardware configuring the network system 200.

The network system 200 is a computer. As illustrated in FIG. 4, the network system 200 includes the following.

a CPU 210
a ROM 220
a RAM 230
a storage 240
a 5G communication interface 250
an operation display 260

These components are communicably connected to each other via a bus 270.

The CPU 210 executes functions of the respective units of the network system 200 described above by executing programs recorded in the ROM 220 and the storage 240.

The ROM 220 stores therein various kinds of programs and various kinds of data.

The RAM 230, as a workspace, temporarily stores therein programs and data.

The storage 240 stores therein various types of programs including an operating system, and various types of data. The storage 240 is a storage medium as follows.

an embedded MultiMediaCard (eMMC),
a solid state drive (SSD),
a hard disk drive (HDD) or the like.

The 5G communication interface 250 serves as the wireless communication controller 201 to communicate with the terminal device 100 and the server 300 in 5G.

The operation display 260 is, for example, a touch panel type display, and the operation display 260 displays various types of information and receives various types of input from a user. In addition, as the operation display 260, an input device such as a keyboard or a mouse and a monitor or the like may be connected to each other.

Server 300

Next, the server 300 will be described. The server 300 analyzes and/or learns the data transmitted from the terminal device 100. In addition, the server 300 generates the control information for causing the terminal device 100 to change the setting of data. As described above, the control information is the control program and/or the logical data for changing the function of the terminal device 100 and information related to the setting of data.

As illustrated in FIG. 2, the server 300 includes a wireless communicator 301, a terminal data analysis learning unit 302, a data transmission reception processing unit 303, and a terminal controller 304 (controller). When the terminal device 100 is referred to as an edge terminal, in contrast to that, the server 300 may be referred to as an edge server. In addition, the server 300 stores, on the network, data collected by the terminal device 100 from the sensor 109, the control program and/or the logical data used by the terminal device 100, and the like. Thus, the server 300 may be referred to as a cloud server.

The wireless communicator 301 communicates with the network system 200 in 5G.

The terminal data analysis learning unit 302 analyzes and learns data received from the terminal device 100. The terminal data analysis learning unit 302 analyzes data received from the terminal device 100. In addition, the terminal data analysis learning unit 302 performs machine learning using data received from the terminal device 100. The analysis and/or the learning by the terminal data analysis learning unit 302 is basically similar to the analysis and/or the learning by the terminal device 100. The server 300 has higher performance and higher functionality than the terminal device 100. Thus, the server 300 can execute more advanced analysis and/or learning than the terminal device 100. The results of the analysis and the learning are output to the terminal controller 304.

The data transmission reception processing unit 303 processes data transmitted to and received from the terminal device 100. The data transmitted from the server 300 is, for example, the control information generated by the terminal controller 304. The data transmission reception processing unit 303 receives the control information from the terminal controller 304 to perform necessary processing thereon, and outputs them to the wireless communicator 301. The necessary processing is, for example, labeling, integration or compression of data, other data processing, or the like.

In addition, the data transmission reception processing unit 303 transmits data received from the terminal device 100 to the terminal data analysis learning unit 302. At this time, the data transmission reception processing unit 303 executes categorization according to labeling, expansion or the like of data as necessary. The data transmission reception processing unit 303 stores the received data in a storage 340 (described below) as necessary.

The terminal controller 304 generates the control information for optimizing data output from the terminal device 100 from the result of the analysis and/or the learning by the terminal data analysis learning unit 302. As described above, the control information is, for example, the control program and/or the logical data for controlling the terminal device 100. In addition, as described above, the control information is data related to the setting of data.

The control program and/or the logical data may be stored in the storage 340 of the server 300 in advance. In this case, for example, it may be assumed in advance what case the function of the terminal device 100 is to be changed, and a control program and/or logical data corresponding to the assumption may be stored therein. The same applies to data related to the setting of data, and the data may be stored in the storage 340 of the server 300 in advance.

Note that in the first embodiment, the terminal controller 304 (controller) is one of the functions of the server 300. Alternatively, the terminal controller 304 (controller) may be implemented by a computer other than the server 300. In this case, the server 300 and the computer are connected each other via a network. As the network in this case, the network system 200 may be used, or another local network may be used. Then, the computer acquires, from the server 300, the result analyzed and/or learned by the server 300 to transmit the control information to the terminal device 100 similarly to the terminal controller 304 (controller) described above.

Figure 5:
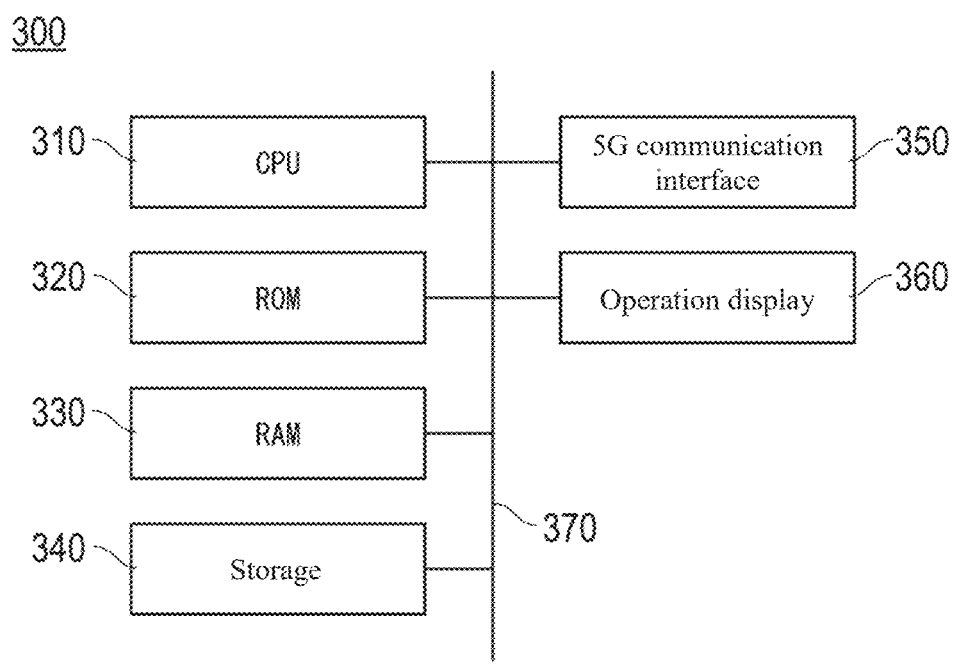
FIG. 5 is a block diagram illustrating an outline of hardware configuring a server.

FIG. 5 is a block diagram illustrating an outline of hardware configuring the server 300.

The server 300 is a computer. As illustrated in FIG. 5, the server 300 includes the following.

a CPU 310
a ROM 320
a RAM 330
the storage 340
a 5G communication interface 350
an operation display 360

These components are communicably connected to each other via a bus 370.

The CPU 310 executes functions of the respective units of the server 300 described above by executing programs recorded in the ROM 320 and the storage 340.

The ROM 320 stores therein various kinds of programs and various kinds of data.

The RAM 330, as a workspace, temporarily stores therein programs and data.

The storage 340 stores therein various types of programs including an operating system, and various types of data. The storage 340 stores the control program and/or the logical data.

In the server 300, a large-capacity storage medium such as an HDD is mainly used as the storage 340. In addition, as the storage 340, a semiconductor storage medium such as an eMMC or an SSD may be used together with the HDD or instead of the HDD.

The 5G communication interface 350 serves as the wireless communicator 301 to communicate with the network system 200 in 5G.

The operation display 360 is, for example, a touch panel type display, and the operation display 360 displays various types of information and receives various types of input from a user. In addition, as the operation display 360, an input device such as a keyboard or a mouse and a monitor or the like may be connected to each other.

Processing Procedure

Next, processing procedure according to the first embodiment will be described.

Figure 6:
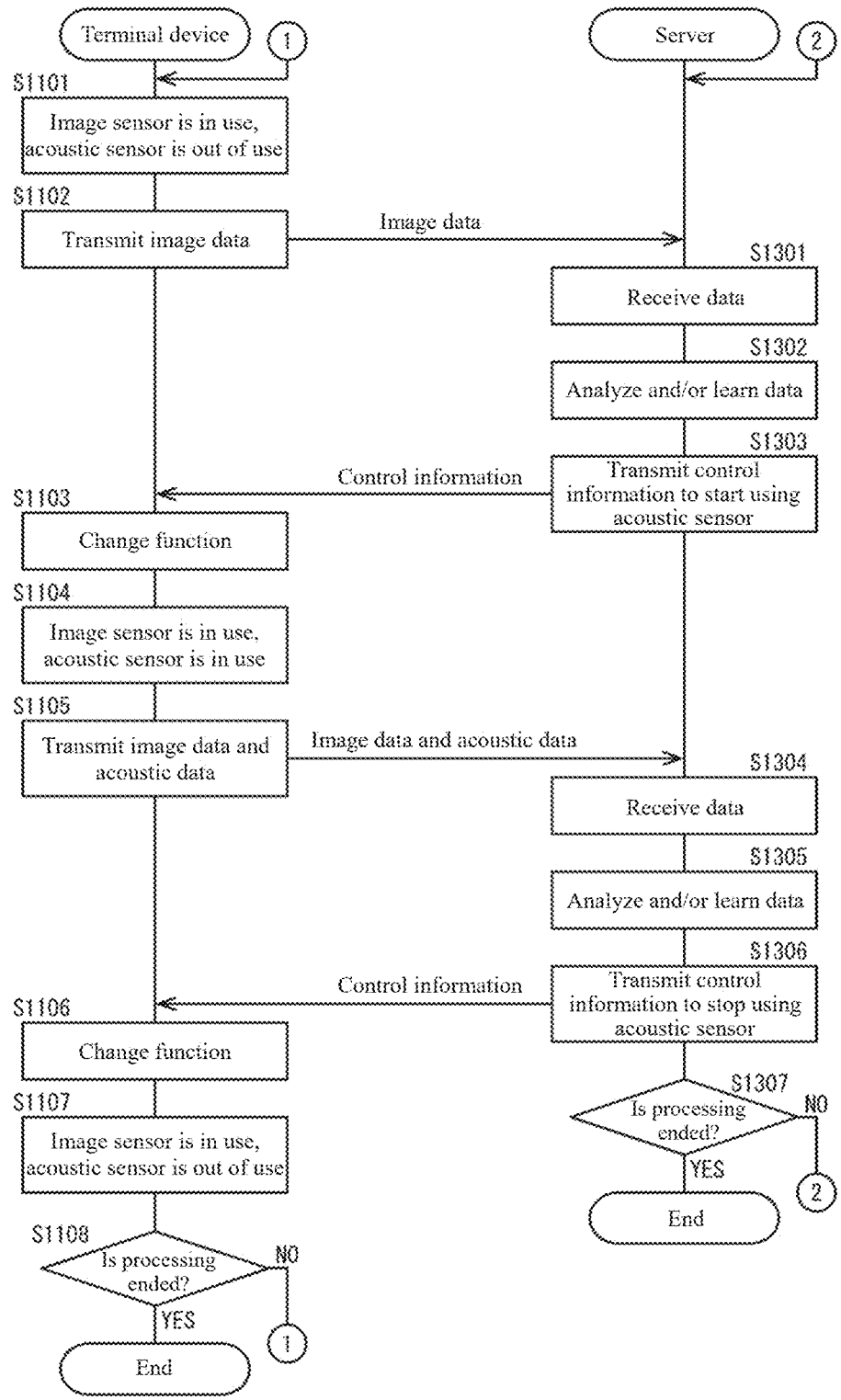
FIG. 6 is a flowchart illustrating processing procedure according to a first embodiment.

FIG. 6 is a flowchart illustrating processing procedure according to a first embodiment. Here, the processing procedure will be described based on the following assumptions. The terminal device 100 includes an image sensor and an acoustic sensor as the plurality of sensors 109. The acoustic sensor collects sound around the terminal device 100, in particular, in a region captured by the image sensor. The server 300 stores, in the storage 340 of the server 300, the control program and/or the logical data for the function change of the terminal device 100. The server 300 executes the analysis and/or the learning from the data of the terminal device 100 type, and transmits, to the terminal device 100, the control information for controlling the terminal device 100.

Here, processing procedure by the terminal device 100 and processing procedure of the server 300 will be described. The server 300 executes a data input control program generated in accordance with this processing procedure. As described above, the data input control program may be executed by the computer that is provided separately from the server 300 to function as the terminal controller 304.

Note that the network system 200 just controls communication between the terminal device 100 and the server 300, so that a description of processing procedure of the network system 200 will be omitted (the same applies to processing procedure in other embodiments).

First, the terminal device 100 monitors a predetermined place (facility) by the image sensor. At this time, the terminal device 100 causes the image sensor to be in use and the acoustic sensor to be out of use (in non-use) (S1101). In this state, the terminal device 100 transmits image data detected by the image sensor to the server 300 (S1102). The image data is constantly transmitted.

The server 300 receives the image date transmitted from the terminal device 100 (S1301).

The server 300 analyzes and/or learns the received image data in time series (S1302). The server 300 detects, for example, the abnormal behavior of a person by analyzing and/or learning the image data. The abnormal behavior is, for example, the behavior of a person staying at the same place for a predetermined time period in a sidewalk, an in-facility path, or the like, or behavior of a person appearing in a place where no person usually exists. The abnormal behavior of a person is determined by, for example, a learning model that has been learned with machine learning in advance to determine the abnormal behavior.

Upon detection of the abnormal behavior of a person as the result of the analysis and/or the learning, the server 300 transmits, to the terminal device 100, the control information for causing the terminal device 100 to start using the acoustic sensor (S1303). The control information is a control program and/or logical data for starting using the acoustic sensor, and is stored in the storage 340 in advance. The control program and/or the logical data transmitted here is preferably, snapshot data. The snapshot data of a control program and/or logical data can be immediately executed by the terminal device 100, so that the switching of the function in the terminal device 100 that has received the data becomes faster.

Note that the server 300 stores therein the control program and/or the logical data transmitted to the terminal device 100. Thus, the server 300 grasps that the acoustic sensor is out of use (in non-use) at the time of step of S1303.

Next, the terminal device 100 receives the control information from the server 300 and changes the function in accordance with the control information (S1103). As described above, the control information received here is the control program and/or the logical data for starting using the acoustic sensor. Thus, the terminal device 100 executes the control program and/or the logical data that has been received. At this time, the terminal device 100 restarts itself as necessary. Accordingly, both the image sensor and the acoustic sensor are in use (S1104) in the terminal device 100.

Next, the terminal device 100 transmits acoustic data collected by the acoustic sensor to the server 300 together with the image data (S1105).

Next, the server 300 receives the image data and the acoustic data (S1304). The server 300 further executes analysis and/or learning from the image data and acoustic data that have been received (S1305). For example, the server 300 detects an abnormality such as a crowd of people from the image data at the step of S1301. In addition to that, the server 300 can further detect a noisy voice of a person, a groan, a shout, a crying voice of a person (child), and the like by the acoustic data to determine details of the abnormal behavior such as a noisy state, an injured or sick state, and a lost child. Conversely, the server 300 can detect that there is no voice of a person or the like to determine that there is no abnormality. Accordingly, the server 300 can accurately determine on an event that is difficult to be determined only from the image.

Subsequently, the server 300 analyzes and/or learns the data received from the terminal device 100. As a result, if the abnormal state has been resolved, the server 300 transmits, to the terminal device 100, the control information for stopping the acoustic sensor (S1306). The control information is the control program and/or the logical data for stopping the acoustic sensor. Here, the control program and/or the logical data is preferably snapshot data as well. A case of the resolution of the abnormal state includes, for example, a case where it is determined from the acoustic data that a voice of a person has disappeared, a case where it is determined from the image data that people have not gathered, or the like.

Next, the terminal device 100 receives the control information from the server 300 and changes the function in accordance with the control information (S1106). As described above, the control information received here is the control program and/or the logical data for stopping the use of the acoustic sensor. Thus, the terminal device 100 executes the control program and/or the logical data that has been received. At this time, the terminal device 100 restarts itself as necessary. Accordingly, in the terminal device 100, the image sensor is in use and the acoustic sensor is stopped to be out of use (S1107).

Next, if there is no instruction to end the processing (S1108: NO), the processing returns to S1101, and the terminal device 100 continues the subsequent processing. Similarly, if there is no instruction to end the processing (S1307: NO), the processing returns to S1301 and the server 300 continues the subsequent processing. On the other hand, if there is an instruction to end the processing (S1108 and S1307: YES), each of the terminal device 100 and the server 300 ends the processing (END).

The first embodiment described above has the following effects.

In the first embodiment, in the monitoring using the image sensor, even in a case where it is difficult to determine the content of the abnormality only from the image data, it is possible to accurately determine the content or situation of the abnormality by further adding the acoustic data. In the first embodiment, the acoustic sensor is in non-use under the normal circumstances. The amount of data to be transmitted from the terminal device 100 to the server 300 can be reduced, thereby reducing the load on the network system 200.

In addition, in the first embodiment, since data from the plurality of sensors 109 can be switched in a short time period, data required for information collection can be collected only as needed and when needed. Thus, in the first embodiment, it is possible to optimize the communication resource under the 5G environment. In addition, in the first embodiment, since it is possible to operate only the sensors 109 that are in use for collecting data, thereby power consumption of the terminal device 100 can be suppressed.

In particular, in the first embodiment, it is possible to perform communication with low latency between the terminal device 100 on which the various sensors 109 are mounted and the server 300 using the 5G infrastructure. Thus, in the first embodiment, the server 300 is caused to perform machine learning with data from the terminal device 100, and from the result, the terminal device 100 can be controlled in real time. For example, in the first embodiment, the server 300 can cause the terminal device 100 to switch between use and non-use of the sensor 109 to collect data required for machine learning by the server 300.

In the first embodiment, the control program and/or the logical data necessary for switching the function of the terminal device 100 is transmitted from the server 300. Thus, in the first embodiment, there is no need to store a control program and/or logical data other than the control program and/or the logical data being executed in the terminal device 100. Thus, in the first embodiment, it is possible to minimize the functions of the terminal device 100 and to achieve a cost reduction.

Note that although the example in which an image sensor and an acoustic sensor are used as the sensors 109 has been described in the description of the processing procedure of the above-described first embodiment, the present invention is not limited to the example. In addition, various sensors can be used according to a situation to be monitored.

As the sensors 109, for example, an image sensor and a temperature sensor can be combined. In this case, the terminal device 100 transmits only the temperature data detected by the temperature sensor to the server 300 under the normal circumstances. The server 300 that has received the temperature data detects the temperature abnormality around the terminal device 100. Meanwhile, the image sensor is in non-use under the normal circumstances, and when an abnormality in temperature is detected, the use of the image sensor is started from the server 300. Accordingly, in the first embodiment, when there is an abnormality in the temperature, it is possible to check the state around the terminal device 100 with the image. Moreover, since the image sensor is in non-use under the normal circumstances, energy saving is achieved by turning off the power source during that period of time. In addition, the temperature data is text data, so that the amount of data is smaller than that of image data. Thus, under the normal circumstances, the load on the network system 200 is reduced.

The temperature sensor may be provided to detect not the ambient temperature but the internal temperature of the terminal device 100 and the sensors 109. In this case, the sensor 109 other than the temperature sensor may be any sensor. For example, in a case where a temperature sensor and an image sensor are combined, the temperature sensor is caused to detect a temperature of the image sensor. The terminal device 100 transmits the temperature data detected by the temperature sensor to the server 300. The server 300 that has received the temperature data detects a sign of abnormality occurrence or an abnormality of the image sensor from the temperature data. A case of the sign of the abnormality occurrence or the abnormality of the image sensor is, for example, a case where the temperature of the image sensor exceeds a heat resistant temperature that is a specification of the image sensor. The server 300 that has detected the temperature abnormality transmits, to the terminal device 100, the control information for stopping the image sensor to cause the terminal device 100 to stop the use of the image sensor. Thus, in the first embodiment, it is possible to prevent the image sensor from occurring or expanding of malfunction. In addition, in a case of detecting the temperature of an image sensor, for example, the terminal device 100 may be provided with a forced cooling device for cooling the image sensor. In this case, when the server 300 detects that the temperature becomes equal to or higher than the predetermined temperature, the server 300 operates the forced cooling device by the control information. The forced cooling device may be an air-cooling fan, a cooling device using a Peltier element or the like.

In addition, in the first embodiment, for example, the sensor 109 that detects environmental characteristics such as humidity and illuminance may be provided together with or instead of the temperature sensor. Accordingly, in the first embodiment, it is detected that there is an abnormality in at least one of environmental characteristics of temperature, humidity, or illuminance around the terminal device 100. In this case, according to the first embodiment, switching can be performed so that data for knowing other environmental characteristics is transmitted to the server 300.

In addition, in the first embodiment, the plurality of sensors 109 of the same type may be provided, and the sensor 109 to be used may be switched therebetween. For example, the terminal device 100 includes the plurality of the same image sensors as the sensors 109. The plurality of image sensors is installed in the same capturing place so as to have different capturing directions and capturing angles. When the server 300 detects an abnormality while any one of the image sensors is in use, the server 300 transmits, to the terminal device 100, the control information for switching to another image sensor that is out of use. The terminal device 100 receives the control information, and switches to another image sensor to transmit the data. Accordingly, in the first embodiment, the data can be obtained that is captured in the location where the abnormality is detected from different directions.

In addition, in a case of including a plurality of the same image sensors, the image sensors may be installed such that capturing ranges thereof partially overlap each other and slightly different ranges are captured. In this case, the server 300 can detect an abnormality while one of the image sensors is in use. In this case, the server 300 transmits, to the terminal device 100, the control information for switching to another image sensor. The terminal device 100 receives the control information and switches the image sensor to be used. Thus, in the first embodiment, for example, in a case where an object moves in a place where the abnormality is detected, the capturing range can be moved in accordance with the movement of the object.

In addition, in the first embodiment, it is possible to cope with the malfunction of the sensor 109. For example, the server 300 can detect the abnormality occurrence of the sensor 109 that is in use, or detect a sign of the abnormality occurrence (continuous operation for a long time period, temperature abnormality, or the like). In this case, the server 300 transmits, to the terminal device 100, the control information for switching to another sensor that is out of use. The terminal device 100 receives the control information to switch the sensor that is in use to another sensor of the same type. Accordingly, in the first embodiment, in a case where of malfunction or the possibility of malfunction of the sensor 109, loss of data can be prevented.

In addition, various sensors 109 can be combined in the first embodiment. The server 300 analyzes and/or learns the data from the various sensors 109. Then, according to the result, the server 300 transmits, to the terminal device 100, the control information for controlling use and non-use of the various sensors 109. Accordingly, the terminal device 100 can transmit (output) data from the sensor that is in use out of these sensors 109.

In the above-described processing procedure of the first embodiment, an example in which the control program and/or the logical data are stored in the storage 340 of the server 300 in advance has been described. The control program and/or the logical data to be stored is a control program and/or logical data corresponding to various situations that is assumed in advance. Alternatively, in the present first embodiment, the following may be generated by the terminal controller 304 according to the result of data processing by the server 300.

a control program and/or logical data for acquiring data to be required subsequently.

The machine learning is performed in advance on what kind of data is required in what kind of situation. Then, the terminal controller 304 is caused to generate the control program and/or the logical data for collecting necessary data.

Second Embodiment

Since the configuration and the functions of the units of the communication system 1 of the second embodiment is similar to these of the first embodiment, the descriptions thereof will be omitted. The second embodiment is different from the above-described first embodiment in the content of control.

Figure 7:
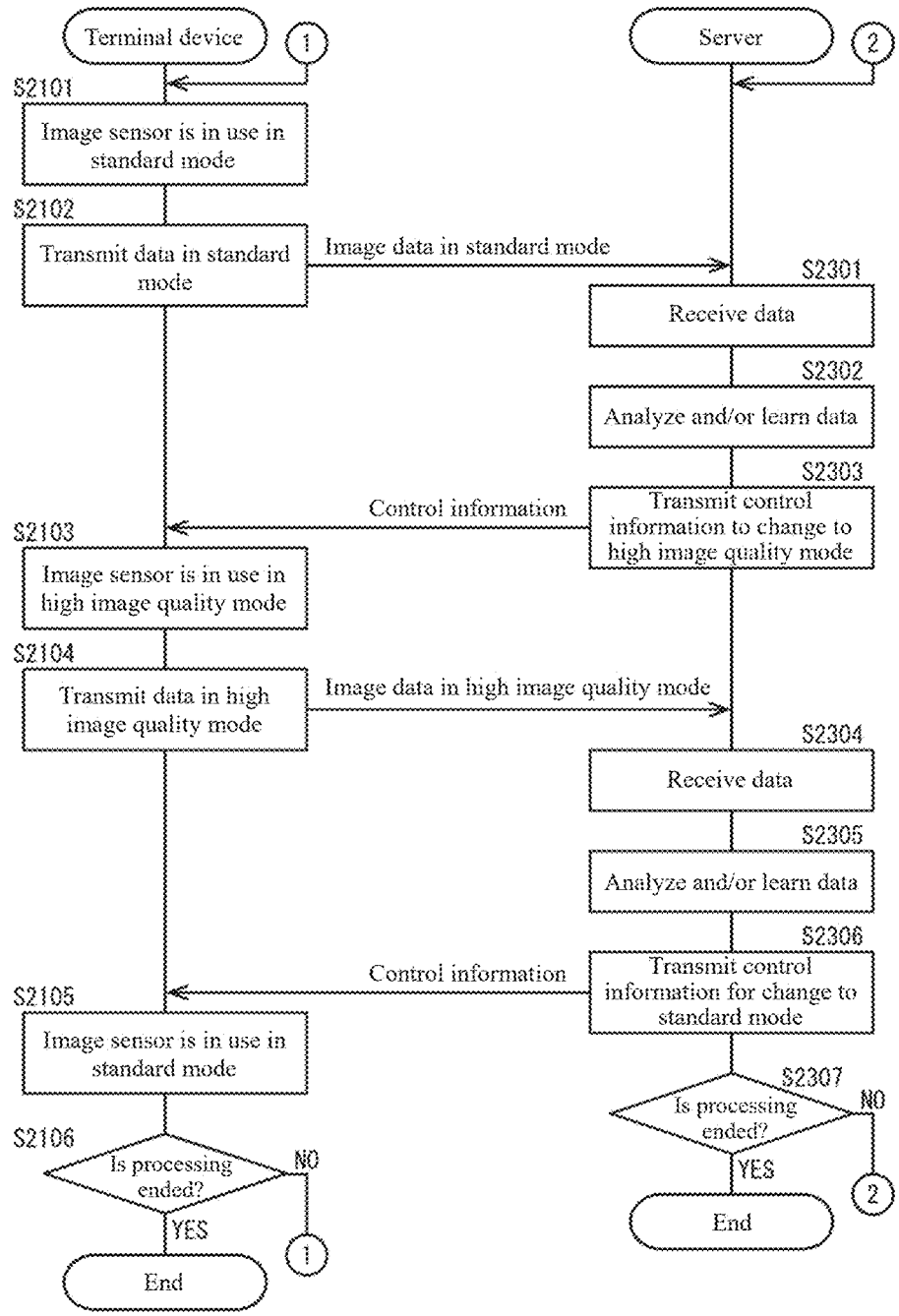
FIG. 7 is a flowchart illustrating processing procedure according to a second embodiment.

FIG. 7 is a flowchart illustrating processing procedure according to a second embodiment. Here, a processing procedure of the second embodiment will be described based on the following assumptions. The terminal device 100 includes one image sensor. The terminal device 100 has a plurality of modes as the modes for determining the image quality of the image detected by the image sensor. The plurality of modes includes, for example, a standard mode and a high image quality mode. The standard mode is a mode in which the resolution, the frame rate, and the color gradation become a reference image quality. The high image quality mode is a mode in which at least one of the resolution, the frame rate, or the color gradation has an image quality higher than that of the standard mode.

The standard mode includes, for example, the full high definition (FHD) resolution (1920×1080), the frame rate of 30 fps, and the 8 bit color depth. The high image quality mode includes, for example, the FHD resolution, the frame rate of 60 fps, and the 10 bit color depth.

First, the terminal device 100 monitors a predetermined place (facility). The terminal device 100 uses the image sensor in the standard mode (S2101). In this state, the terminal device 100 transmits image data in the standard mode detected by the image sensor to the server 300 (S2102). The image data is constantly transmitted.

The server 300 receives the image date transmitted from the terminal device 100 (S2301).

The server 300 analyzes and/or learns the received image data in time series (S2302). The server 300 detects, for example, the abnormal behavior of a person by analyzing and/or learning the image data. The abnormal behavior is, for example, the behavior of a plurality of persons staying at the same place for a predetermined time period in a sidewalk, an in-facility path, or the like. In addition, the abnormal behavior is, for example, the behavior of a person appearing in a place where no person usually exists. The abnormal behavior of a person is determined by, for example, a learning model that has been learned with machine learning in advance to determine the abnormal behavior.

The server 300 detects the abnormal behavior of a person as the result of the analysis and/or the learning. Furthermore, in order to determine the details of the abnormal behavior, the server 300 transmits, to the terminal device 100, the control information for causing the terminal device 100 to change to the high image quality mode (S2303). The control information here is information related to the setting of data and is a command to change the mode. The information related to the setting of data does not change the control program and/or the logical data of the terminal device 100.

Note that the server 300 stores therein information related to the setting of data transmitted to the terminal device 100. Thus, the server 300 grasps that the image sensor of the terminal device 100 is in use in the standard mode at the time of step of S2303.

The terminal device 100 receives the control information from the server 300 and changes the image mode in accordance with the control information. The control information received here is information for changing to the high image quality mode, as described above. Thus, the terminal device 100 changes the operation of the image sensor to the high image quality mode in accordance with the received control information. Accordingly, in the terminal device 100, the image sensor is in use in the high image quality mode (S2103).

Next, the terminal device 100 transmits the image captured in the high image quality mode to the server 300 (S2104).

Next, the server 300 receives the image data in the high image quality mode (S2304). The server 300 further executes the analysis and/or the learning from the received image data in the high image quality mode (S2305). With the high image quality mode, the server 300 can determine the clothing and color of gathering people and can perform face authentication for identification of a person from the clearer image data.

Next, the server 300 analyzes and/or learns the data received from the terminal device 100. As the result, if the abnormal state has been resolved, the server 300 transmits, to the terminal device 100, the control information for switching to the standard mode (S2306). The control information is the information related to the setting of data for switching to the standard mode. A case of the resolution of the abnormal state is, for example, a case where it is determined from the image data that people have not gathered.

Subsequently, the terminal device 100 receives the control information from the server 300 and causes the image sensor to operate in the standard mode in accordance with the control information. Accordingly, the image sensor of the terminal device 100 is in use in the standard mode (S2105).

Next, if there is no instruction to end the processing (S2106: NO), the processing returns to S2101, and the terminal device 100 continues the subsequent processing. Similarly, if there is no instruction to end the processing (S2307: NO), the processing returns to S2301 and the server 300 continues the subsequent processing. On the other hand, if there is an instruction to end the processing (S2106 and S2307: YES), each of the terminal device 100 and the server 300 ends the processing (END).

The second embodiment described above has the following effects in addition to the effects of the first embodiment.

According to the second embodiment, in the monitoring using the image sensor, the standard mode and the high image quality mode are provided as modes for determining the image quality. Then, under the normal circumstances, data captured in the standard mode with low image quality and small amount of data, is transmitted to the server 300. Thus, according to the second embodiment, the load on the network system 200 can be reduced under the normal circumstances. On the other hand, when an abnormality occurs, data captured in the high image quality mode with high image quality is transmitted to the server 300. Thus, in the second embodiment, when an abnormality occurs, the contents of the abnormality can be more accurately grasped. As described above, in the second embodiment, data of image quality required for information collection can be switched in a short time period, so that communication resources can be optimized under the 5G environment while power is suppressed.

Note that in the description of the processing procedure according to the second embodiment described above, the resolution, the frame rate, and the color gradation are changed as an example of changing the image quality. However, the image quality may be changed by, for example, changing the compression ratio of the image data. As for the compression rate of the image data, for example, as a moving image in the standard mode, the moving image compressed data such as a moving picture experts group (MPEG) is transmitted. As a moving image in the high image quality mode, a still image such as uncompressed and non-developed raw image format (RAW) data may be continuously transmitted. In addition, in a case where a camera on which a zoom lens is mounted is used as the image sensor, a zoom magnification may be changed as the change of the image quality. For the image quality modes, in addition to the standard mode and the high image quality mode, a low image quality mode having an image quality lower than that of the standard mode may be provided, and the three modes may be switched therebetween. The low image quality mode includes, for example, the high definition (HD) resolution (1920×720), the frame rate of 30 fps, and the 8 bit color depth. In addition, the image quality mode may be a combination of the low image quality mode and the standard mode, a combination of the low image quality mode and the high image quality mode, or the like.

Alternatively, in the second embodiment, instead of changing the image quality of one image sensor, a full-color image sensor and an infrared sensor may be combined. For the image quality modes in this case, grayscale image data indicating a temperature distribution by the infrared sensor is set as the standard mode, and full-color image data by the full color image sensor is set as the high image quality mode. In addition, in the high image quality mode, image data obtained by superimposing full color image data by the full color image sensor on gray scale image data of the temperature distribution by the infrared sensor may be used.

In addition, also in the second embodiment, the terminal device 100 can include various sensors 109 similar to in the first embodiment.

Third Embodiment

Since the configuration and the functions of the units of the communication system 1 of the third embodiment is similar to these of the first embodiment, the descriptions thereof will be omitted. The third embodiment is different from the above-described first embodiment in the content of control.

Figure 8:
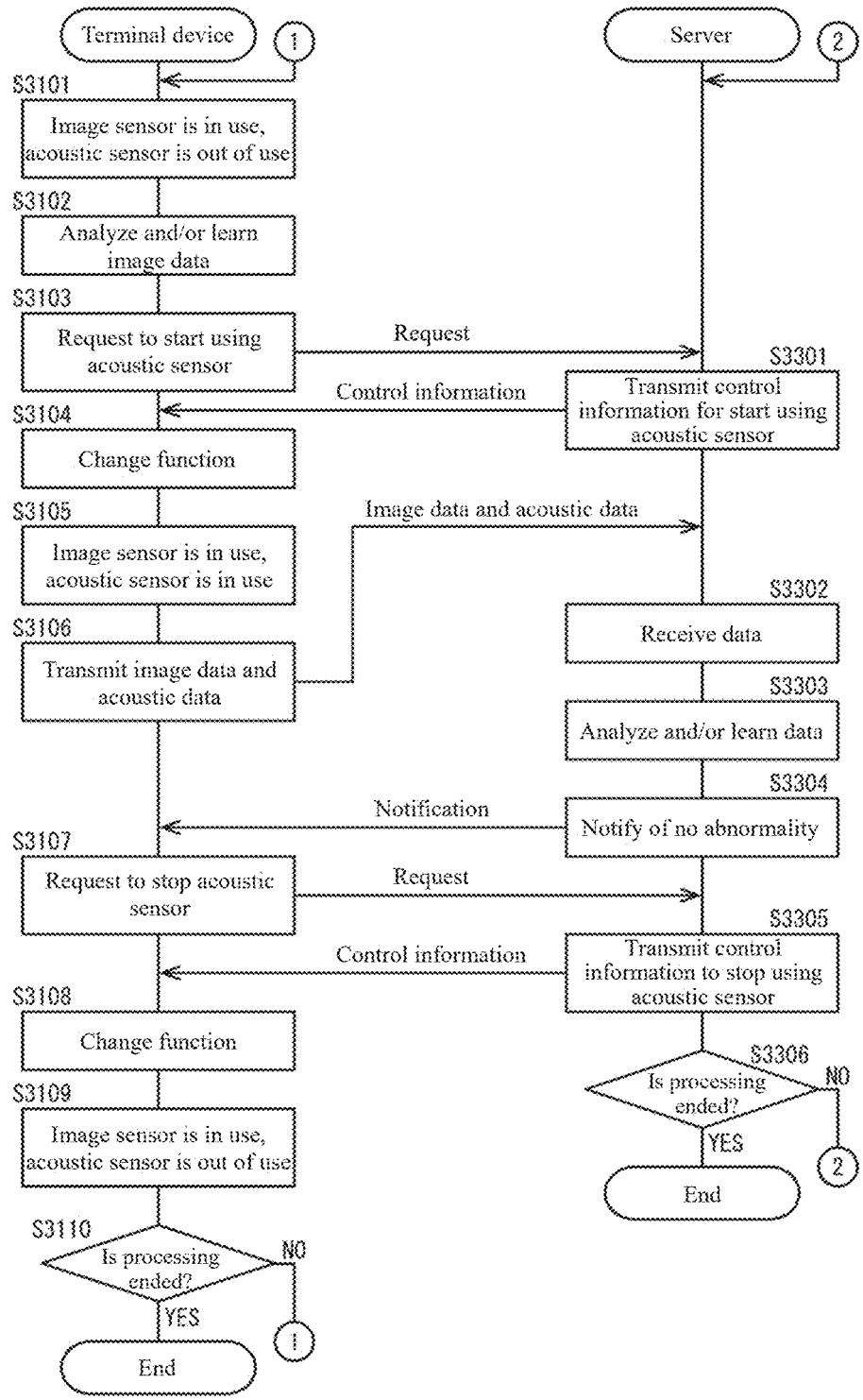
FIG. 8 is a flowchart illustrating processing procedure according to a third embodiment.

FIG. 8 is a flowchart illustrating processing procedure according to a third embodiment. Here, the processing procedure will be described based on the following assumptions. The terminal device 100 includes an image sensor and an acoustic sensor as the plurality of sensors 109. The acoustic sensor collects sound around the terminal device 100, in particular, in a region captured by the image sensor. The terminal device 100 also executes analysis and/or learning on its own. The server 300 stores, in the storage 340 of the server 300, the control program and/or the logical data for the function change of the terminal device 100. The server 300 executes more advanced analysis and/or learning from than the terminal device 100, and transmits, to the terminal device 100, the control information for controlling the terminal device 100.

First, the terminal device 100 monitors a predetermined place (facility) by the image sensor. At this time, the terminal device 100 causes the image sensor to be in use and the acoustic sensor to be out of use (in non-use) (S3101). In this state, the terminal device 100 analyses and/or learns on its own the image data detected by the image sensor (S3102). In the step of S3102, the terminal device 100 does not transmit the image data to the server 300. This is because the analysis and/or the learning using only image data is executed by the terminal device 100.

Next, upon detection of the abnormal behavior of a person as the result of the analysis and/or the learning, the terminal device 100 requests the server 300 to start using the acoustic sensor (S3103). At this time, the terminal device 100 notifies the server 300 that the abnormal behavior has been detected as the result of the analysis and/or the learning. Similar to the first embodiment, the abnormal behavior determined by the terminal device 100 is, for example, the behavior of a person staying at the same place for a predetermined time period in a sidewalk, an in-facility path, or the like, or the behavior of a person appearing in a place where no person usually exists. The abnormal behavior of a person is determined by, for example, a learning model that has been learned with machine learning in advance to determine the abnormal behavior.

Next, the server 300 transmits the control information for starting using the acoustic sensor to the terminal device 100 in accordance with the received request (S3301). The control information is a control program and/or logical data for starting using the acoustic sensor, and is stored in the storage 340 in advance. The control program and/or the logical data transmitted here is preferably, snapshot data. The snapshot data of the control program and/or the logical data can be immediately executed by the terminal device 100. Thus, in the terminal device 100 that has received the snapshot data, switching of the function becomes faster.

Note that in the third embodiment, the server 300 may not store what kind of control program and/or logical data has been transmitted to the terminal device 100. This is because the server 300 transmits the control information in response to the request from the terminal device 100. Thus, it is not necessary for the server 300 to grasp the operation state of the terminal device 100.

Next, the terminal device 100 receives the control information from the server 300 and changes the function in accordance with the control information (S3104). As described above, the control information received here is the control program and/or the logical data for starting using the acoustic sensor. Thus, the terminal device 100 executes the control program and/or the logical data that has been received. At this time, the terminal device 100 restarts itself as necessary. Accordingly, both the image sensor and the acoustic sensor are in use (S3105) in the terminal device 100.

Next, the terminal device 100 transmits, to the server 300, acoustic data collected by the acoustic sensor together with the image data (S3106).

Next, the server 300 receives the image data and the acoustic data (S3302). The server 300 performs more advanced analysis and/or learning than the terminal device 100 from the received image and acoustic data (S3303). For example, the server 300 detects, from the notification of the abnormal behavior received from the terminal device 100 and from the image data and the acoustic data, a noisy voice of a person, a groan, a shout, a crying voice of a person (child), and the like. Accordingly, the server 300 can determine details of the abnormal behavior such as a noisy state, an injured or sick state, and a lost child. Conversely, the server 300 can detect that there is no voice of a person or the like to determine that there is no abnormality. Accordingly, the server 300 can accurately determine on an event that is difficult to be determined only by the terminal device 100.

Next, if the abnormal state has been resolved from the result of the analysis and/or the learning of the data received from the terminal device 100, the server 300 notifies that terminal device 100 that there is no abnormality (S3304). A case of the resolution of the abnormal state is, for example, a case where it is determined from the acoustic data that a voice of a person has disappeared.

Next, the terminal device 100 requests the stop of the acoustic sensor by receiving the notification indicating that the abnormal state is resolved (S3107).

Next, the server 300 transmits the control information for stopping the acoustic sensor to the terminal device 100 in accordance with the received request (S3305). The control information is the control program and/or the logical data for stopping the acoustic sensor. Here, the control program and/or the logical data is preferably snapshot data as well.

Next, the terminal device 100 receives the control information from the server 300 and changes the function in accordance with the control information (S3108). As described above, the control information received here is the control program and/or the logical data for stopping the use of the acoustic sensor. Thus, the terminal device 100 executes the control program and/or the logical data that has been received. At this time, the terminal device 100 restarts itself as necessary. Accordingly, in the terminal device 100, the image sensor is in use and the acoustic sensor is stopped to be in non-use (S3109).

In the third embodiment, if the server 300 determines that there is no abnormality, the step of S3304 may be omitted. Then, the control information (a control program and/or logical data) for stopping the use of the acoustic sensor may be transmitted from the server 300 to the terminal device 100. In this case, the step of S3107 is omitted in the terminal device 100.

In addition, in the third embodiment, when it is determined that people have not gathered from the result of the analysis and/or the learning of the image data by the terminal device 100, it may be determined that the abnormal state is resolved. In this case, the terminal device 100 may request the server 300 to stop the acoustic sensor. In this case, the terminal device 100 may make a request for stopping the acoustic sensor without waiting for a notification from the server 300 that the abnormal state has been resolved.

Next, if there is no instruction to end the processing (S3110: NO), the processing returns to S3101, and the terminal device 100 continues the subsequent processing. Similarly, if there is no instruction to end the processing (S3306: NO), the processing returns to S3301 and the server 300 continues the subsequent processing. On the other hand, if there is an instruction to end the processing (S3110 and S3306: YES), each of the terminal device 100 and the server 300 ends the processing (END).

The third embodiment described above has the following effects in addition to the effects of the first embodiment.

In the third embodiment, the terminal device 100 performs analysis and/or learning using image data, and the server 300 performs advanced analysis and/or learning using image data and acoustic data. Thus, in the third embodiment, it is possible to accurately determine, by the advanced analysis and/or learning by the server 300, on an event that is difficult to be determined only by the analysis and/or the learning by the terminal device 100.

Note that in the third embodiment, similarly to the first embodiment described above, various sensors 109 can be used according to a situation to be monitored.

In the third embodiment, the terminal controller 304 of the server 300 may be caused to generate a control program and/or logical data in response to a request from the terminal device 100.

Alternatively, in the third embodiment, the terminal device 100 may change the image quality mode as a result of the analysis and/or the learning by the terminal device 100 to transmit the data after the change to the server 300.

Although the embodiment of the present invention has been described above, the present invention is not limited to the above-described embodiments.

For example, in a modification of the embodiment, switching between use and non-use of the terminal device 100 itself may be performed in order to change data to be input to the server 300. For example, the server 300 detects an abnormality from image data transmitted from the monitoring camera device 100c. When the server 300 detects an abnormality, the server 300 causes the portable terminal device 100a that can collect information from similar place to the capturing place of the monitoring camera device 100c to transmit data. Thus, the server 300 transmits, to the portable terminal device 100a, the control information for activating the portable terminal device 100a if the portable terminal device 100a is out of use. Note that when the portable terminal device 100a is out of use, the portable terminal device 100a is stopped in a state in which it is possible to receive control information and restart itself in accordance therewith. Such a modification has the similar effects to the above-described embodiments.

The conditions, numerical values, and the like used in the description of the embodiments are merely for explanation, and the present invention is not limited to these conditions and numerical values.

The communication control program according to the present invention can also be implemented by a dedicated hardware circuit. In addition, the communication control program may be provided by a computer-readable recording medium such as a universal serial bus (USB) memory, a digital versatile disc (DVD)-read only memory (ROM), or the like. The communication control program may be provided online via a network such as the Internet, or the like without using the recording medium. In a case where a communication control program is provided online, the communication control program is recorded on a recording medium (storage) such as a magnetic disk, or the like in a computer connected to a network.

In addition, the present invention can be modified in various manners based on the configurations described in the claims, and those modifications are also within the scope of the present invention.

This application is based on Japanese Patent Application No. 2021-9449 filed on Jan. 25, 2021, the disclosure of which is incorporated herein by reference in its entirety.

REFERENCE SIGNS LIST 1 communication system
100 terminal device
100a portable terminal device
100c monitoring camera device
101 wireless communicator
102 data change request unit
103 data transmission reception processing unit
104 data change setting unit
105 data analysis learning unit
106, 240, 340 storage
109 sensor
110 SoCFPGA
150 5G communication interface
160 operation display
200 network system
201 wireless communication controller
203 processing relay determination unit
300 server
301 wireless communicator
302 terminal data analysis learning unit
303 data transmission reception processing unit
304 terminal controller (controller)

The invention claimed is:

1. A communication system comprising:
a terminal device including a sensing device;
a network system at least a part of which includes wireless communication; and
a server that performs wireless communication with the terminal device through the network system and processes data received from the terminal device, wherein
the communication system includes a hardware processor that controls the terminal device, and
the hardware processor transmits, to the terminal device, control information for switching the data to be input to the server according to processing of the data by the server.

2. The communication system according to claim 1, wherein
the terminal device includes a plurality of the sensing devices.

3. The communication system according to claim 1, wherein
the communication system includes a plurality of the terminal devices.

4. The communication system according to claim 3, wherein the control information includes control information for stopping the terminal device and causing the terminal device to transmit data to another terminal device that is stopped.

5. The communication system according to claim 1, wherein
the control information includes a control program and/or logical data for controlling the terminal device.

6. The communication system according to claim 5, wherein
the control program and/or the logical data includes a command to switch between use and non-use of the sensing device.

7. The communication system according to claim 6, wherein
the terminal device switches between use and non-use of the sensing device, and transmits, to the server, the data including information detected by the sensing device that is in use, by executing the control program and/or the logical data.

8. The communication system according to claim 5, wherein
the control program and/or the logical data includes a command to start or stop transmission of the data from the terminal device to the server.

9. The communication system according to claim 8, wherein
the terminal device starts or stops transmission of the data to the server, by executing the control program and/or the logical data.

10. The communication system according to claim 5, wherein
the control program and/or the logical data includes at least one command selected from the group consisting of a command to stop power supplied to the sensing device, a command to stop communication with the sensing device, and a command to rewrite a learning model of the terminal device.

11. The communication system according to claim 10, wherein
the terminal device executes at least one selected from the group consisting of stopping power supplied to the sensing device, stopping communication with the sensing device, and rewriting a learning model of the terminal device, by executing the control program and/or the logical data.

12. The communication system according to claim 5, wherein
the hardware processor generates the control program and/or the logical data by learning the data.

13. The communication system according to claim 5, wherein
the control program and/or the logical data includes snapshot data of a program for controlling the terminal device.

14. The communication system according to claim 1, wherein
the control information includes information related to setting of the data.

15. The communication system according to claim 14, wherein
the sensing device includes an image sensor, and
the information related to setting of the data includes at least one piece of information selected from the group consisting of a setting of a zoom magnification of image data detected by the image sensor, a setting of a frame rate thereof, a setting of a resolution thereof, a setting of a data format thereof, a setting of a color gradation thereof, a setting of a compression ratio thereof, and a setting of whether or not to output thereof.

16. The communication system according to claim 15, wherein
the terminal device transmits, to the server, the image data after switching setting of the image data based on information related to setting of the data.

17. The communication system according to claim 1, wherein
the terminal device requests the hardware processor to transmit the control information.

18. The communication system according to claim 1, wherein
the terminal device switches between use and non-use of the sensing device according to an environmental characteristic.

19. The communication system according to claim 18, wherein
the environmental characteristic includes at least one of temperature, humidity, and illuminance around the terminal device.

20. The communication system according to claim 1, wherein
the terminal device notifies the hardware processor of an operating time period of the sensing device.

21. The communication system according to claim 1, wherein
the terminal device includes a storage, and
the terminal device stores information detected by the sensing device in the storage when a data amount of information detected by the sensing device exceeds a predetermined data amount.

22. A non-transitory recording medium storing a computer readable data input control program for causing a computer connected to a communication system comprising a terminal device including a sensing device, a network system at least a part of which includes wireless communication, and a server that performs wireless communication with the terminal device through the network system and processes data received from the terminal device to control input to the server,
the computer readable data input control program for causing the computer to execute:
a step (a) of transmitting, to the terminal device, control information for switching the data to be input to the server according to processing of the data by the server.

23. The non-transitory recording medium according to claim 22, wherein
the control information includes a control program and/or logical data for controlling the terminal device.

24. The non-transitory recording medium according to claim 23, wherein
the control program and/or the logical data includes a command to switch between use and non-use of the sensing device.

25. The non-transitory recording medium according to claim 23, wherein
the control program and/or the logical data includes a command to start or stop transmission of the data from the terminal device to the server.

26. The non-transitory recording medium according to claim 23, wherein
the control program and/or the logical data includes at least one command selected from the group consisting of a command to stop power supplied to the sensing device, a command to stop communication with the sensing device, and a command to rewrite a learning model of the terminal device.

27. The non-transitory recording medium according to claim 23, wherein
the computer readable data input control program further causes the computer to execute:
a step (b) of generating the control program and/or the logical data by learning the data.

28. The non-transitory recording medium according to claim 23, wherein
the control program and/or the logical data includes snapshot data of a program for controlling the terminal device.

29. The non-transitory recording medium according to claim 22, wherein
the control information includes information related to setting of the data.

30. The non-transitory recording medium according to claim 29, wherein
the sensing device includes an image sensor, and
the information related to setting of the data includes at least one piece of information selected from the group consisting of a setting of a zoom magnification of image data detected by the image sensor, a setting of a frame rate thereof, a setting of a resolution thereof, a setting of a data format thereof, a setting of a color gradation thereof, a setting of a compression ratio thereof, and a setting of whether or not to output thereof.

31. The non-transitory recording medium according to claim 22, wherein
the step (a) is executed in response to a request for transmission of control information transmitted from the terminal device.

* * * * *